United States Patent
Bohrer et al.

(10) Patent No.: US 10,887,252 B2
(45) Date of Patent: Jan. 5, 2021

(54) EFFICIENT SCATTER-GATHER OVER AN UPLINK

(71) Applicant: MELLANOX TECHNOLOGIES, LTD., Yokneam (IL)

(72) Inventors: Dror Bohrer, Nesher (IL); Noam Bloch, Bat Shlomo (IL); Peter Paneah, Nesher (IL); Richard Graham, Knoxville, TN (US)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 116 days.

(21) Appl. No.: 16/181,376

(22) Filed: Nov. 6, 2018

(65) Prior Publication Data
US 2019/0149486 A1    May 16, 2019

Related U.S. Application Data

(60) Provisional application No. 62/585,567, filed on Nov. 14, 2017, provisional application No. 62/595,605, filed on Dec. 7, 2017.

(51) Int. Cl.
| | |
|---|---|
| *G06F 15/167* | (2006.01) |
| *H04L 12/879* | (2013.01) |
| *H04L 12/883* | (2013.01) |
| *H04L 12/931* | (2013.01) |
| *H04L 12/861* | (2013.01) |
| *H04L 12/935* | (2013.01) |

(52) U.S. Cl.
CPC ........ *H04L 49/901* (2013.01); *H04L 49/3072* (2013.01); *H04L 49/358* (2013.01); *H04L 49/9021* (2013.01); *H04L 49/9057* (2013.01); *H04L 49/9068* (2013.01)

(58) Field of Classification Search
None
See application file for complete search history.

(56) References Cited

U.S. PATENT DOCUMENTS

| | | |
|---|---|---|
| 8,255,475 B2 | 8/2012 | Kagan et al. |
| 8,645,663 B2 | 2/2014 | Kagan et al. |
| 9,456,060 B2 | 9/2016 | Pope et al. |

(Continued)

OTHER PUBLICATIONS

Bruck et al., "Efficient Algorithms for All-to-All Communications in Multiport Message-Passing Systems", IEEE Transactions on Parallel and Distributed Systems, vol. 8, No. 11, pp. 1143-1156, Nov. 1997.

(Continued)

*Primary Examiner* — Phyllis A Book
(74) *Attorney, Agent, or Firm* — Kligler & Associates Patent Attorneys Ltd

(57) ABSTRACT

A network interface device is connected to a host computer by having a memory controller, and a scatter-gather offload engine linked to the memory controller. The network interface device prepares a descriptor including a plurality of specified memory locations in the host computer, incorporates the descriptor in exactly one upload packet, transmits the upload packet to the scatter-gather offload engine via the uplink, invokes the scatter-gather offload engine to perform memory access operations cooperatively with the memory controller at the specified memory locations of the descriptor, and accepts results of the memory access operations.

19 Claims, 5 Drawing Sheets

(56) References Cited

U.S. PATENT DOCUMENTS

| | | | |
|---|---|---|---|
| 2002/0165897 A1* | 11/2002 | Kagan | G06F 13/1605 718/102 |
| 2003/0120835 A1* | 6/2003 | Kale | G06F 13/28 710/22 |
| 2004/0030745 A1* | 2/2004 | Boucher | H04L 45/66 709/203 |
| 2005/0223118 A1* | 10/2005 | Tucker | H04L 67/1097 709/250 |
| 2007/0127525 A1* | 6/2007 | Sarangam | H04L 69/169 370/469 |
| 2008/0219159 A1* | 9/2008 | Chateau | H04L 69/32 370/230 |
| 2009/0240838 A1 | 9/2009 | Berg et al. | |
| 2009/0296699 A1* | 12/2009 | Hefty | G06F 13/128 370/389 |
| 2009/0327444 A1 | 12/2009 | Archer et al. | |
| 2010/0274876 A1 | 10/2010 | Kagan et al. | |
| 2010/0329275 A1 | 12/2010 | Johnsen et al. | |
| 2013/0215904 A1* | 8/2013 | Zhou | H04L 47/62 370/412 |
| 2013/0312011 A1 | 11/2013 | Kumar et al. | |
| 2014/0040542 A1 | 2/2014 | Kim et al. | |
| 2014/0136811 A1* | 5/2014 | Fleischer | G06F 15/785 711/207 |
| 2015/0074373 A1 | 3/2015 | Sperber et al. | |
| 2015/0193271 A1 | 7/2015 | Archer et al. | |
| 2015/0261720 A1 | 9/2015 | Kagan et al. | |
| 2015/0347012 A1 | 12/2015 | Dewitt et al. | |
| 2016/0119244 A1 | 4/2016 | Wang et al. | |
| 2016/0162188 A1* | 6/2016 | Padia | G06F 13/102 710/112 |
| 2016/0283422 A1 | 9/2016 | Crupnicoff et al. | |
| 2017/0192782 A1 | 7/2017 | Valentine et al. | |
| 2017/0235702 A1* | 8/2017 | Horie | G06F 15/17331 709/212 |
| 2017/0308329 A1 | 10/2017 | A et al. | |
| 2018/0052803 A1 | 2/2018 | Graham et al. | |

OTHER PUBLICATIONS

Gainaru et al., "Using InfiniBand Hardware Gather-Scatter Capabilities to Optimize MPI All-to-All", EuroMPI '16, Edinburgh, United Kingdom, 13 pages, year 2016.

MPI: A Message-Passing Interface Standard, Version 3.1, Message Passing Interface Forum, 868 pages, Jun. 4, 2015.

Shattah et al, U.S. Appl. No. 15/996,548, filed Jun. 4, 2018.

U.S. Appl. No. 15/681,390 office action dated Nov. 9, 2018.

U.S. Appl. No. 15/681,390 office action dated May 14, 2019.

* cited by examiner

EFFICIENT SCATTER-GATHER OVER AN UPLINK

CROSS-REFERENCE TO RELATED APPLICATIONS

This Application claims the benefit of U.S. Provisional Application Nos. 62/585,567, filed 14 Nov. 2017 and 62/595,605 filed Dec. 7, 2017, which are herein incorporated by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to transmission of digital information over a communications network. More particularly, this invention relates to efficient memory operations on data carried over a communications network.

2. Description of the Related Art

The meanings of certain acronyms and abbreviations used herein are given in Table 1.

TABLE 1

Acronyms and Abbreviations

| | |
|---|---|
| API | Application Programming Interface |
| CPU | Central Processing Unit |
| DDR | Double Data Rate |
| DRAM | Dynamic Random Access Memory |
| NIC | Network Interface Controller |
| PCIe | Peripheral Component Interconnect Express |
| SGT | Strided Gather Transaction |
| SGTB | Strided Gather Transaction Buffer |
| VDM | Vendor Defined Message |
| WQE | Work Queue Element |

An I/O device, such as a NIC, may receive incoming data to be scattered in small chunks to different locations in the local host memory, or may be requested to gather and transmit small chunks of data from different locations in the local host memory.

The I/O device typically accesses the local host memory by initiating transactions on an uplink channel to the host, such as a PCIe bus. In systems that are known in the art, the NIC initiates a separate PCIe transaction for each chunk of data that it must scatter or gather in host memory. Each offload transaction requires its own uplink header. As a result, the transactions consume substantial bandwidth and incur high latency.

Attempts have been made in the art to save memory bandwidth in transactions of the sort described above. For example, U.S. Patent Application Publication No. 2014/0040542 proposes a scatter-gather technique that optimizes streaming memory accesses, dealing with irregular memory access patterns using a scatter-gather engine that is cooperative with a memory cache.

SUMMARY OF THE INVENTION

According to disclosed embodiments of the invention, the NIC does not initiate a separate offload transaction for each chunk of data, but rather sends a single descriptor over the uplink, specifying multiple addresses in the host memory from which data are to be gathered or scattered. A module on the other end of the uplink, typically associated with or a part of the host memory controller, executes the uplink descriptor and thus carries out all of the relatively small gather or scatter operations on behalf of the NIC. Only a single offload transaction is required, regardless of the number of separate chunks of data that need to be gathered or scattered.

There is provided according to embodiments of the invention a method of communication, which is carried out in a network interface device connected to a host computer by an uplink. The host computer includes a memory, a memory controller, and a scatter-gather offload engine linked to the memory controller. The network interface device is configured for preparing a descriptor including a plurality of specified memory locations, incorporating the descriptor in exactly one upload packet, transmitting the upload packet from the network interface device to the scatter-gather offload engine via the uplink, invoking the scatter-gather offload engine to perform memory access operations cooperatively with the memory controller at the specified memory locations of the descriptor, and to return results of the memory access operations to the network interface device.

According to one aspect of the method, the memory access operations comprise a gather operation, and the results comprise stored data that is read from the specified memory locations.

According to a further aspect of the method, the memory access operations comprise a scatter operation, and the descriptor also includes data to be stored at respective ones of the specified memory locations.

According to yet another aspect of the method, returning results includes transmitting the results from the host computer to the network interface device in a response packet via the uplink.

According to still another aspect of the method, preparing a descriptor includes generating respective pointers to the specified memory locations.

According to an additional aspect of the method, preparing a descriptor includes specifying a stride that defines an offset between successive ones of the specified memory locations.

According to another aspect of the method, preparing a descriptor also includes incorporating a base address of the memory therein, and specifying respective sizes of data segments at the specified memory locations.

According to one aspect of the method, preparing a descriptor also includes specifying a total size of the data segments at the specified memory locations and specifying a number of times to repeat a pattern defined by the stride and an offset between successive instances of the pattern.

There is further provided according to embodiments of the invention an apparatus for communication, including a network interface device connected to a data network, and a host computer connected to the network interface device by an uplink. The host computer comprises a memory, a memory controller, and a scatter-gather offload engine linked to the memory controller. The network interface device is operative for preparing a descriptor including a plurality of specified memory locations, incorporating the descriptor in exactly one upload packet, transmitting the upload packet from the network interface device to the scatter-gather offload engine via the uplink, invoking the scatter-gather offload engine to perform memory access operations cooperatively with the memory controller at the specified memory locations of the descriptor, and accepting results of the memory access operations via the uplink.

BRIEF DESCRIPTION OF THE SEVERAL VIEWS OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

In the following description, numerous specific details are set forth in order to provide a thorough understanding of the various principles of the present invention. It will be apparent to one skilled in the art, however, that not all these details are necessarily always needed for practicing the present invention. In this instance, well-known circuits, control logic, and the details of computer program instructions for conventional algorithms and processes have not been shown in detail in order not to obscure the general concepts unnecessarily.

Documents incorporated by reference herein are to be considered an integral part of the application except that, to the extent that any terms are defined in these incorporated documents in a manner that conflicts with definitions made explicitly or implicitly in the present specification, only the definitions in the present specification should be considered.

Figure 1:
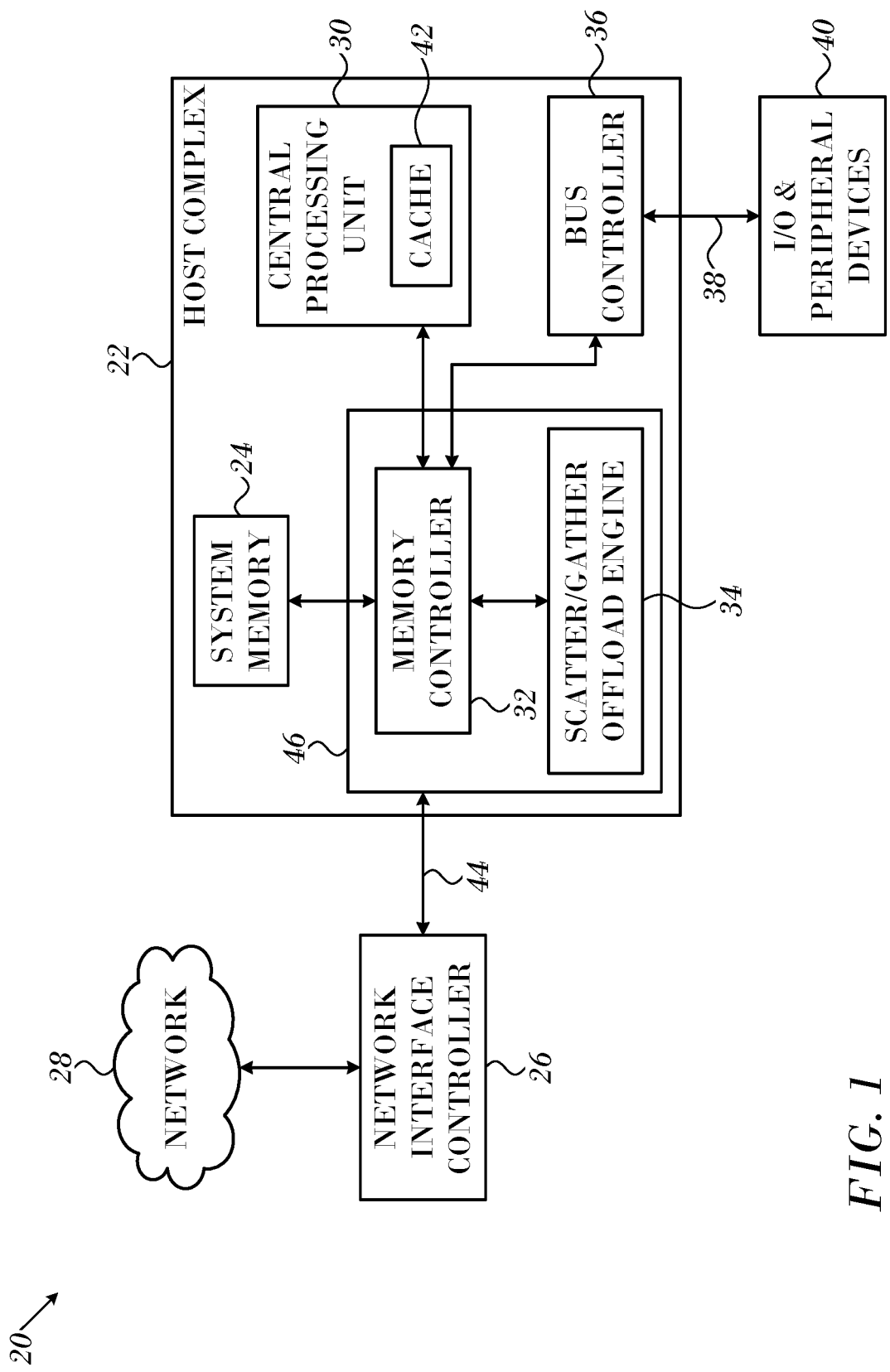
FIG. 1 is a block diagram of a host computer with enhanced data communication capabilities in accordance with an embodiment of the invention.

FIG. 1 is a block diagram of a host computer 20 with enhanced data communication capabilities, in accordance with an embodiment of the present invention. Computer 20 is a system that is typically embodied in a set of integrated circuit chips, mounted and interconnected on a suitable substrate. The computer comprises a host complex 22, a system memory 24 and a NIC 26, which connects the computer to a packet network 28, such as an Ethernet or InfiniBand switch fabric. The architecture of the computer 20 is exemplary, and the principles of the invention may be applied by those skilled in the art to other architectural arrangements.

Host complex 22 and memory 24 may be of standard design. Memory 24 may comprise DRAM, but may be any suitable memory. The term host complex refers to a central processing unit (CPU 30) of computer 20 along with associated components. Such components typically include a memory controller 32 and an expansion bus controller 36, which may be integrated with the CPU 30 on a single integrated circuit chip or provided on one or more separate chips. CPU 30 communicates with memory 24 via memory controller 32, which typically has a DDR interface for this purpose. Alternatively, memory 24 and memory controller 32 may have memory interfaces of other sorts, which may be in accordance with any other applicable standard. Typically, CPU 30 also comprises at least one cache 42, which holds copies of data from memory 24 for low-latency access by the CPU, as is known in the art. Linked to memory controller 32 is scatter-gather offload engine 34, which facilitates certain memory operations. The scatter-gather offload engine 34 is typically implemented as a dedicated hardware logic unit, which may be a part of the memory controller 32. Alternatively the scatter-gather offload engine 34 may be incorporated in the CPU 30 or realized as a separate hardware component. In any case, the scatter-gather offload engine 34 receives offload transactions from the NIC 26 and executes the transactions by scattering or gathering data to or from the memory 24 as specified. The functions of the scatter-gather offload engine 34 are described below in detail.

Expansion bus controller 36, such as a PCI bus controller, communicates via an expansion bus, such as a PCI Express bus 38, with input/output (I/O) and other peripheral devices 40 in computer 20.

In systems that are known in the art, memory controller 32 of host complex 22 is connected directly to system memory 24 via interfaces (not shown). Memory access by NIC 26 in connection with packet transmission and reception over network 28 likewise may take place via a bus interface (not shown) and connection 44, such as a PCI Express bus, to a memory control module 46. The control module 46 comprises the memory controller 32 and scatter-gather offload engine 34. A memory access request originating in NIC 26 may be directed either to memory controller 32 or, in certain cases described below, to the scatter-gather offload engine 34. In the latter the scatter-gather offload engine 34 controls and coordinates activities of the memory controller 32 according to descriptors received from the NIC 26. The interface between the scatter-gather offload engine 34 and the memory controller 32 uses read/write commands compatible with the memory controller's specification.

In embodiments of the invention, the scatter-gather offload engine 34 can be implemented inside the memory controller, in the CPU, or in any other location within the host complex 22.

Figure 2:
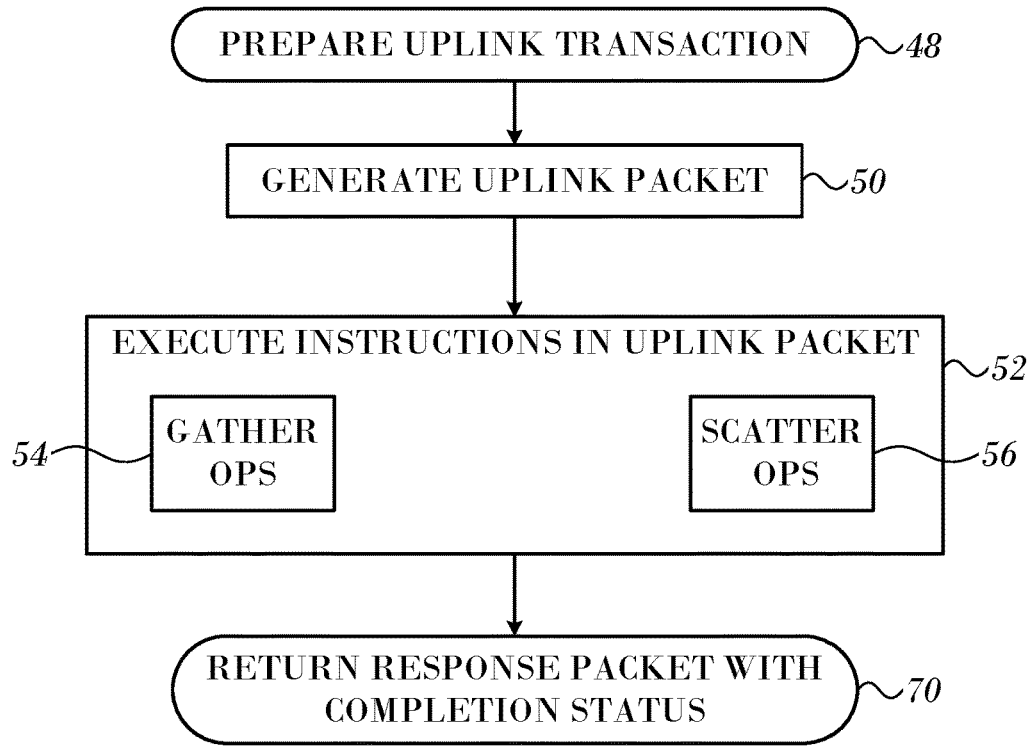
FIG. 2 is a flow chart illustrating a process of offloading scatter and gather operations to a scatter-gather engine according to embodiments of the invention.

FIG. 2 is a flow chart illustrating a process according to embodiments of the invention, in which the NIC 26 offloads groups of scatter and gather operations that are smaller than a certain threshold data size to scatter-gather offload engine 34 that is located within or coupled to the host memory controller. As noted above, the NIC 26 does not initiate a separate transaction for each chunk of data, but rather sends a single descriptor over the connection 44 in a single offload transaction, specifying multiple addresses in the memory 24 from which data are to be gathered or scattered. The descriptor can be a gather descriptor or a scatter descriptor for gather and scatter operations, respectively.

In initial step 48 the NIC 26 prepares a single offload transaction, e.g., a PCIe transaction containing a descriptor comprising multiple specified memory locations at which to gather or scatter data. The descriptor may comprise a list of pointers to the memory 24. Alternatively, the descriptor may comprise a stride between consecutive elements of a source array. For example, a stride could be 1 MB between memory accesses of 8 Bytes. Further alternatively, the descriptor can comprise a pattern specifying the layout of the memory locations that are to be gathered from or scattered to in the single offload transaction.

An exemplary shared memory API is presented in Listing 1.

Listing 1 void shmem_iput(TYPE*dest, const TYPE*source, ptrdiff_t dst, ptrdiff_t sst, size_t nelems, int pe);

| OUT | dest | Array to be updated |
|---|---|---|
| IN | source | Array containing the data to be copied |
| IN | dst | Stride between consecutive elements of the dest array. The stride is scaled by the element size of the dest array. |
| IN | Sst | Stride between consecutive elements of the source array. The stride is scaled by the element size of the source array. |
| IN | Nelems | Number of elements in the dest and source arrays |
| IN | pe | Processing element number of a remote processing element |

To initiate the offload transaction, in step 50 the NIC 26 generates an uplink-destined packet (also referred to as an "uplink packet") containing the descriptor described in initial step 48. For a scatter operation, the uplink packet includes the data that are to be scattered or references to the data. For a gather operation, the descriptor in the uplink packet defines the data that are to be fetched. The scatter-gather offload engine 34 fetches only the required data from the host memory.

On the other end of the uplink connection 44, in step 52 the scatter-gather offload engine 34 receives the uplink packet and executes the actions specified in the uplink descriptor to carry out all of the gather or scatter operations on behalf of the NIC cooperatively with the memory controller 32.

Step 52 comprises steps 54, 56 in which scatter and gather operations are carried out respectively on behalf of the NIC 26. Gathering data from memory is actually a packing process. As noted above, a collection limited to needed data segments from memory is described by a single descriptor in uplink packets—e.g., a single header or control is used to pack together all data segments into a single packet. In different embodiments, packed data can be sent over the network, and unpacked in a remote node to be distributed to a remote memory, e.g., by the scatter operation described above.

Figure 3:
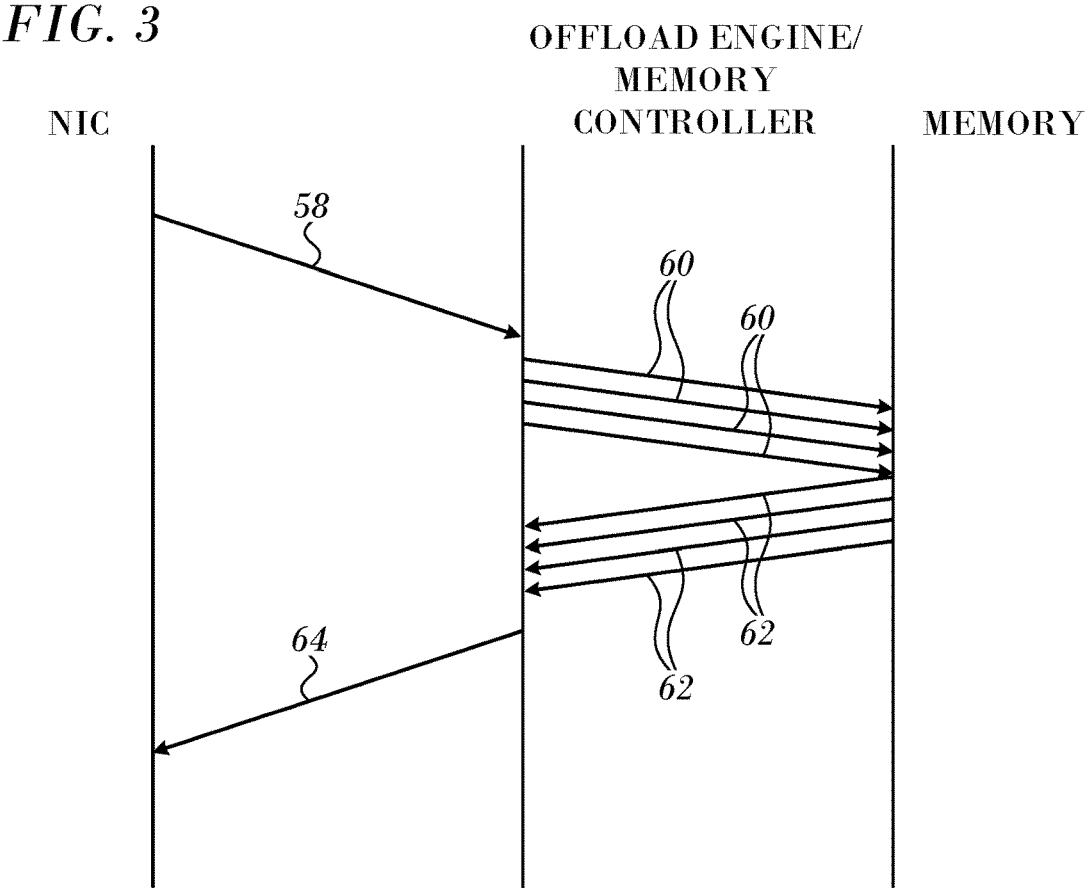
FIG. 3 is an event diagram illustrating gather operations according to embodiments of the invention.

FIG. 3 is an event diagram illustrating the gather operations of step 54. Arrow 58 represents transmission of the uplink packet from the NIC 26 to the scatter-gather offload engine 34, e.g., as a PCIe non-posted read. The scatter-gather offload engine 34, cooperatively with the memory controller 32, receives the descriptor in the uplink packet and causes memory read accesses in memory 24 at addresses specified in the descriptor to read the required data. This event is represented by arrows 60. A read status for each of the read accesses is available to the memory controller 32. Arrows 62 represent movement of the data from the memory back to the scatter-gather offload engine 34, where, after all data has been received, the data is packed into a response packet, e.g., as a non-posted PCIe completion. The response packet includes the packed data and a completion status. Arrow 64 represents movement of the response packet from the memory controller 32 over the connection 44 to the NIC 26.

Figure 4:
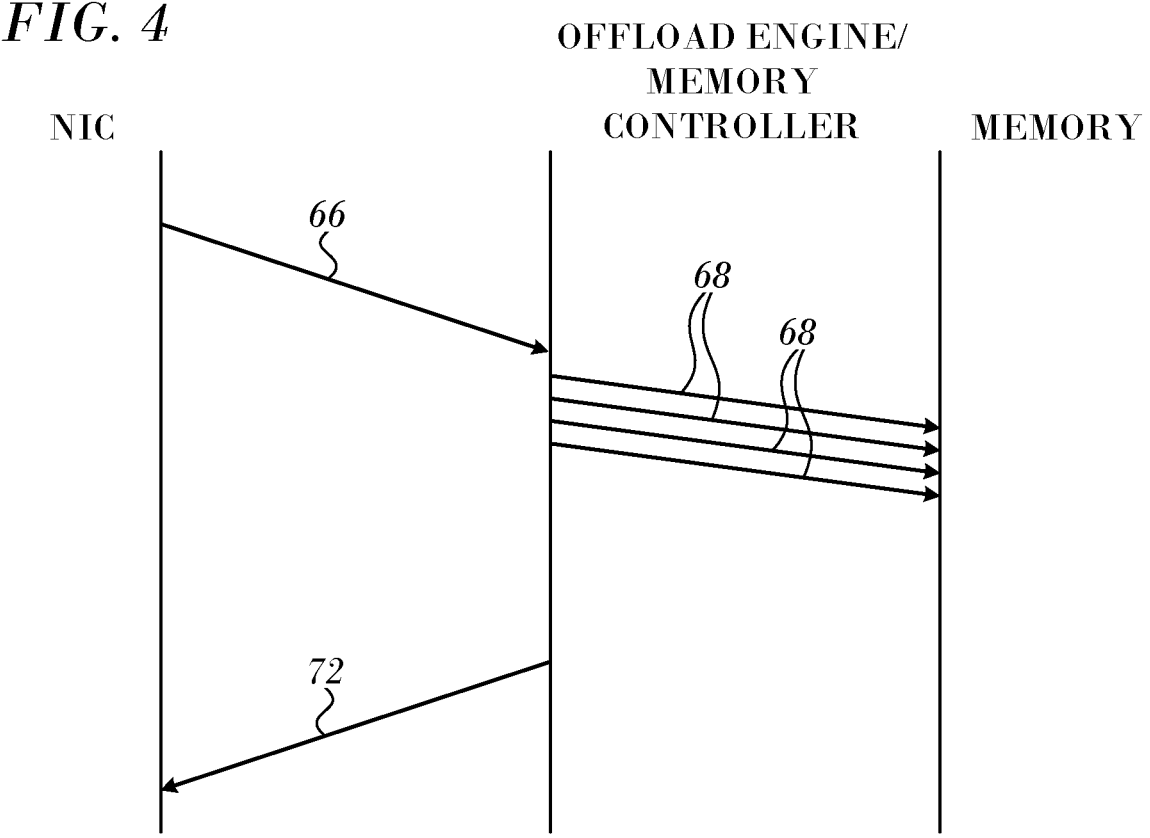
FIG. 4 is an event diagram illustrating scatter operations according to embodiments of the invention.

FIG. 4 is an event diagram illustrating the scatter operations of step 56. Arrow 66 represents transmission of the uplink packet from the NIC 26 to the scatter-gather offload engine 34 over the connection 44. The scatter-gather offload engine 34 receives the uplink packet, and, cooperatively with the memory controller 32, causes a series of memory write accesses in memory 24 in accordance with the descriptor in the uplink packet and scatters the data accordingly. The write accesses are represented by arrows 68 A write status for each of the write accesses is available to the memory controller 32. A response packet is prepared in the scatter-gather offload engine 34 as a single response transaction, e.g., a PCIe nonposted completion Then, reverting to FIG. 2, in final step 70 the response packet is returned to the NIC 26 via the connection 44. This is illustrated by arrow 72 in FIG. 4.

Referring again to FIG. 1, processes running on the CPU 30, such as user applications and connection handling software modules, may interact with NIC 26 by manipulating a transport service instance, known as a "queue pair" (QP). To send and receive messages over the network 28 using NIC 26, processes running on CPU 30 submit work items, called work queue elements (WQEs), to the appropriate queues for execution by the NIC 26. For example, as disclosed in commonly assigned copending application Ser. No. 15/996, 548, entitled Stateful Connection Tracking, which is herein incorporated by reference, packet steering logic (not shown) read a WQE from a receive queue of the QP and instruct a scatter-gather module to write the information to a data buffer indicated by the WQE.

Figure 5:
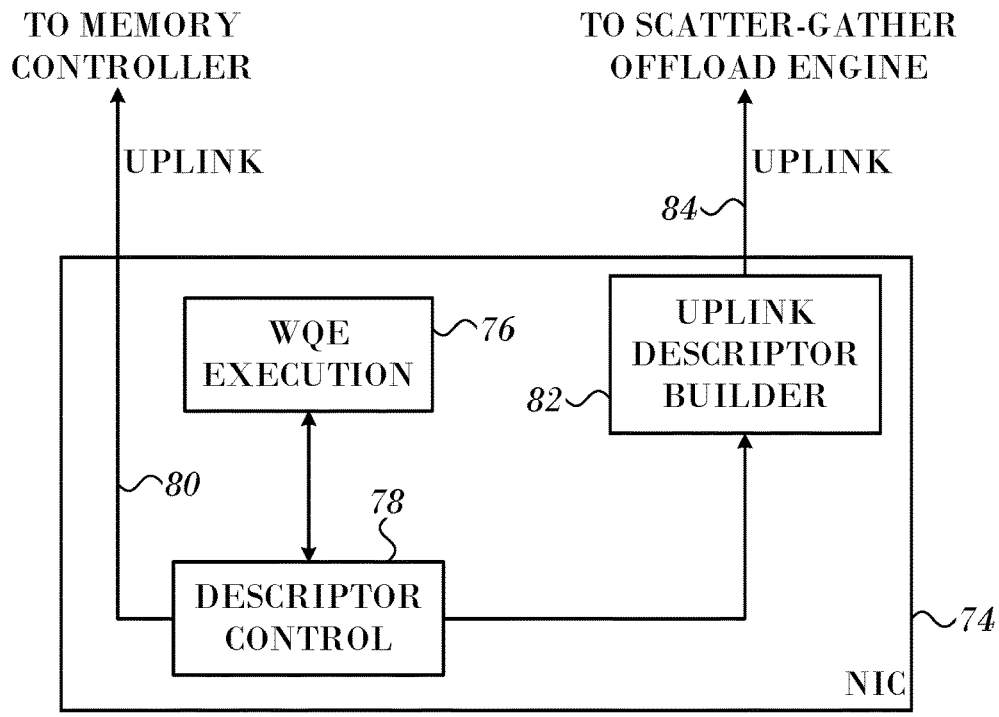
FIG. 5 is a block diagram of a gather operation initiated by a Work Queue Element in an NIC according to an embodiment of the invention.

FIG. 5 is a simplified block diagram of an NIC 74 illustrating a gather operation initiated in block 76 by a WQE in NIC 74 according to an embodiment of the invention. A descriptor control block 78 in NIC 74 determines how the data is to be gathered from the memory 24 in the host complex 22 (FIG. 1), according to a governing policy.

If the data is to be gathered conventionally, a standard uplink request, e.g., a PCIe non-posted read request, is transmitted to the memory controller 32, indicated by arrow 80. However, if the data is to be consolidated into multiple read requests, as described with reference to FIG. 3, then, an upload descriptor builder 82 is instructed to build a gather descriptor and send it as an uplink packet over the connection 44 to the scatter-gather offload engine 34, as indicated by arrow 84.

For example, the descriptor control block 78 may invoke the upload descriptor builder 82 when the gather list in the WQE contains more than a threshold number of separate addresses and the data to be read from each address is smaller than a threshold size. The decision parameters can be configurable in each system for performance tuning.

Figure 6:
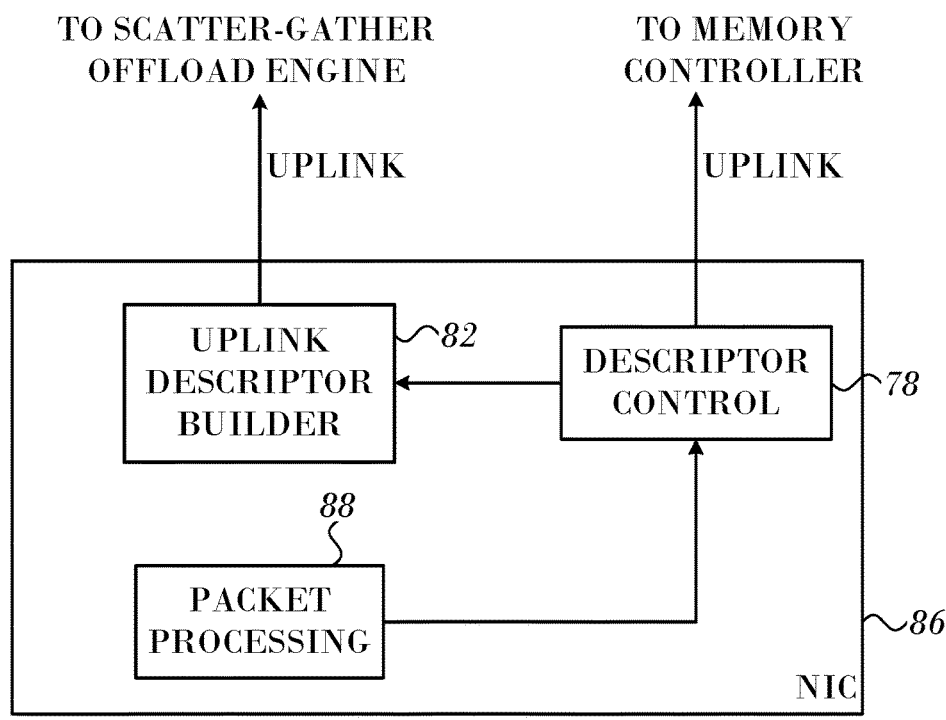
FIG. 6 is a block diagram illustrating a scatter operation executed in an NIC responsively to an incoming packet in accordance with an embodiment of the invention.

FIG. 6 is a simplified block diagram illustrating a scatter operation, which is executed responsively to incoming packets in a NIC 86 in accordance with an embodiment of the invention. The packets are processed in packet processing block 88 and submitted to descriptor control block 78. In the descriptor control block 78 it is determined whether to scatter the incoming data to a host memory conventionally and send the data directly to the memory controller 32, or to instruct upload descriptor builder 82 to build a scatter descriptor and send the scatter descriptor to the scatter-gather offload engine 34 (FIG. 1) for execution. The decision logic may be similar to that described above in the discussion of FIG. 5.

Scatter and Gather Descriptor Examples

Example 1

TABLE 2

| Pointer Descriptor | | |
|---|---|---|
| | Address | |
| Last | | Length |
| | Address | |
| Last | | Length |
| | Address | |
| Last | | Length |

In the example shown in Table 2, a descriptor contains a list of pointers to memory. The parameters are:
Address: Memory address of data.
Length: Size of the data to be gathered or scattered
Last: If set, the last pointer in the descriptor. If clear, the next segment is another pointer.

Example 2

TABLE 3

| Stride Descriptor | | |
|---|---|---|
| | Address | |
| | Total Length | |
| Length | | Stride |

Stride Descriptor

In the example shown in Table 3, a descriptor specifies data access according to a stride. The parameters are:

Address: Base address in memory.
Total Length: Total length of the data to be scattered or gathered.
Length: Size of each data segment.
Stride: Offset between successive data segments to be accessed.

Example 3

In the example shown in Table 4, the descriptor is a pattern that combines pointers and data accessed according to a stride. The descriptor can repeat a pattern multiple times.

TABLE 4

| | Address | |
|---|---|---|
| | Total Length | |
| Last | | Total Length |
| | Address | |
| Last | | Length |
| Last | | Multiple |
| | Multiple Stride | |

The parameters are:
Address: Base address in memory.
Total Length: Total length to scatter or gather.
Stride: Offset between successive writes.
Length: size of every data segment. (The stride is the offset between these segments.) Last—if set—last pointer in descriptor, if clear—next segment is another pointer.
Multiple: repeat (from start of descriptor)—number of times to repeat pattern.
Multiple Stride: Offset between every pattern.
PCIe Implementation.

Figure 7:
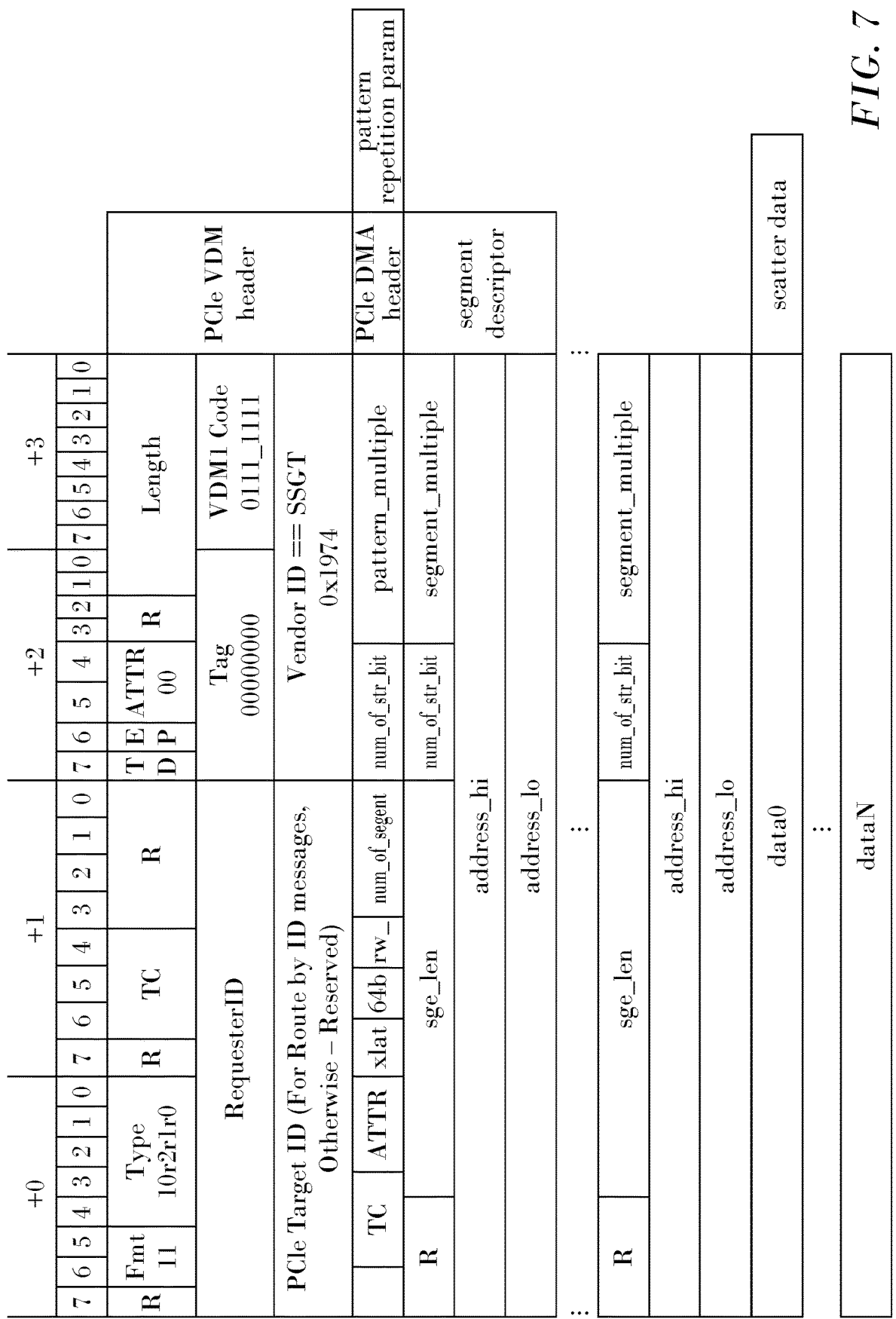
FIG. 7 illustrates a packet format suitable for implementation of scatter-gather operations in accordance with an embodiment of the invention.

A packet format for a PCIe implementation for efficient scatter-gather operations is shown in FIG. 7. The notation in FIG. 7 is explained in Table 5.

TABLE 5

Type (r2r1r0):
000 - route to RC, 010 - route by ID
VendorID[15:0] == SSGT (Strided Scatter Gather Transaction). Need to define a number agreed by all involved sides. Currently putting 0x1974
RequesterID[15:0]: Indicates the BDF of the originator. Should be used as requesterID at the completions sent by the responder for DMA that is read
rev_num[1:0]: revision number of the SSG header. 0 for current implementation
TC[2:0]: Traffic Class of the encapsulated DMA transaction (can be used by CPU for differentiation of ordering flows)
ATTR[2:0]: bit0 - no_snoop, bit1 - relaxed ordering, bit2 - ido. ATTR bits of the encapsulated DMA transaction
xlat: AT[1] bit of the encapsulated DMA transaction (1 - translated, 0 - untranslated)
64b = 1). Thus the data0 will start at the dword number: 4 + (64b ? 12: 8) * num_of_segments
pattern_multiple[11:0]:
pattern_multiple[num_of_str_bits-1:0] - pattern stride (size in bytes of the stride for the pattern described by the segments)
pattern_multiple[11:num_of_str_bits] - number of repetirions of the strided pattern
num_of_str_bits: number of bits at the pattern_multiple field indicating the stride
sge_len[11:0]: scatter-gather element length in bytes
segment_multiple[11:0]:

TABLE 5-continued segment_multiple[num_of_str_bits-1:0] - segment stride (size in bytes of the stride for the segment described by address and
segment_len) 13 segment_multiple[11:num_of_str_bits] - number of repetitions of the strided segment
address_hi[31:0]: in the case of 64-bit address this is the highest 32 bits of the address. In the case of 32-bit address this is the address
address_lo[31:0]: in the case of 64-bit address this is the lower 32 bits of address
Dword alignment, similar to the PCIe definition, is used. It means that the data is always dword aligned, putting PADs before the first byte and after the last byte if needed. For example 3 bytes to the address 7 will be placed as follows:
7 6 5 4 3 2 1 0 7 6 5 4 3 2 1 0 7 6 5 4 3 2 1 0 7 6 5 4 3 2 1 0
                                                                                           Byte 0
Byte 1                Byte 2          Byte 3

Implementation Details.

For the case of DMA, in a Strided Gather Transaction (SGT) the read is encapsulated in a PCIe Vendor Defined Message (VDM), which travels along the PCIe fabric using posted credits (since VDMs are posted). However, when it arrives at the destination, it is treated as non-posted. It might happen that upon arrival of such a request there are no resources at the receiver side to handle a non-posted request. This might result in blocking of subsequent posted requests and eventually might result in deadlock. To avoid this situation several approaches are suggested:

1) Provide a separate buffer for SGTs—SGTB (Strided Gather Transactions Buffer). The number of its entries (each of the size of the maximum SGT entry) should be equal to the number of posted credits that the port advertises. Posted credit is released by the receiver upon handling a standard posted packet or upon popping of the SGT entry from the SGTB.

2) If responses for a SGT can always be treated as completions with relaxed ordering bit set (no need to require ordering between SGT completions and writes from the host to the device) then forward progress of the SGT will not depend on outbound posted progress. Therefore, deadlock is prevented (deadlock in which an inbound posted message depends on an outbound posted message). In addition, the receiver may implement an ability for posted transaction to bypass VDMs of SGTB type in order to preventing possible blocking or deadlock.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A method of communication, comprising the steps of:
in a network interface device connected to a host computer by an uplink, the host computer comprising a memory, a memory controller, and a scatter-gather offload engine linked to the memory controller;
determining that a group of scatter-gather operations are smaller than a threshold data size and performing the following for the group of operations that are smaller than the threshold data size:
preparing a descriptor comprising a plurality of specified memory locations for the group of operations that are smaller than the threshold data size;
incorporating the descriptor in an upload packet;
transmitting the upload packet from the network interface device to the scatter-gather offload engine via the uplink;
invoking the scatter-gather offload engine to perform memory access operations cooperatively with the memory controller at the specified memory locations of the descriptor; and
returning results of the memory access operations to the network interface device.

2. The method according to claim 1, wherein the memory access operations comprise a gather operation, and the results comprise stored data that is read from the specified memory locations.

3. The method according to claim 1, wherein the memory access operations comprise a scatter operation, and the descriptor further comprises data to be stored at respective ones of the specified memory locations.

4. The method according to claim 1, wherein returning results comprises transmitting the results from the host computer to the network interface device in a response packet via the uplink.

5. The method according to claim 1, wherein preparing a descriptor comprises generating respective pointers to the specified memory locations.

6. The method according to claim 1, wherein preparing a descriptor comprises specifying a stride that defines an offset between successive ones of the specified memory locations.

7. The method according to claim 6, wherein preparing a descriptor further comprises incorporating a base address of the memory therein, and specifying respective sizes of data segments at the specified memory locations.

8. The method according to claim 7, wherein preparing a descriptor further comprises specifying a total size of the data segments at the specified memory locations and a number of times to repeat a pattern defined by the stride and an offset between successive instances of the pattern.

9. A network interface device connected to a host computer external to the network interface device by an uplink, the host computer comprising a memory, a memory controller, and a scatter-gather offload engine linked to the memory controller, the network interface device being operative for:
determining that a group of scatter-gather operations are smaller than a threshold data size and performing the following for the group of operations that are smaller than the threshold data size:
preparing a descriptor comprising, for the group of operations that are smaller than the threshold data size, a plurality of specified memory locations of the host computer;
incorporating the descriptor in an upload packet;

transmitting the upload packet from the network interface device to the scatter-gather offload engine via the uplink;

invoking the scatter-gather offload engine to perform memory access operations cooperatively with the memory controller at the specified memory locations of the descriptor; and accepting results of the memory access operations via the uplink.

10. The network interface device according to claim 9, wherein the memory access operations comprise a gather operation, and the results comprise stored data that is read from the specified memory locations.

11. The network interface device according to claim 9, the memory access operations comprise a scatter operation, and the descriptor further comprises data to be stored at respective ones of the specified memory locations.

12. The network interface device according to claim 9, wherein accepting results comprises accepting the results from the host computer in the network interface device in a response packet via the uplink.

13. The network interface device according to claim 9, wherein preparing a descriptor comprises generating respective pointers to the specified memory locations.

14. The network interface device according to claim 9, wherein preparing a descriptor comprises specifying a stride that defines an offset between successive ones of the specified memory locations.

15. The network interface device according to claim 14, wherein preparing a descriptor further comprises incorporating a base address of the memory therein, and specifying respective sizes of data segments at the specified memory locations.

16. The network interface device according to claim 15, wherein preparing a descriptor further comprises specifying a total size of the data segments at the specified memory locations and a number of times to repeat a pattern defined by the stride and an offset between successive instances of the pattern.

17. The method according to claim 1, wherein the upload packet comprises exactly one upload packet.

18. The network interface device according to claim 9, wherein the upload packet comprises exactly one upload packet.

19. An apparatus for communication, comprising:

a network interface device; and a host computer connected to the network interface device by an uplink, the host computer comprising a memory, a memory controller, and a scatter-gather offload engine linked to the memory controller, wherein the network interface device is operative for:

preparing a descriptor comprising a plurality of specified memory locations of the host computer;

incorporating the descriptor in exactly one upload packet;

transmitting the upload packet from the network interface device to the scatter-gather offload engine via the uplink;

invoking the scatter-gather offload engine to perform memory access operations cooperatively with the memory controller at the specified memory locations of the descriptor; and accepting results of the memory access operations via the uplink, wherein preparing a descriptor comprises: specifying a stride that defines an offset between successive ones of the specified memory locations; incorporating a base address of the memory therein; specifying respective sizes of data segments at the specified memory locations; and specifying a total size of the data segments at the specified memory locations and a number of times to repeat a pattern defined by the stride and an offset between successive instances of the pattern.

* * * * *